United States Patent [19]
Entwistle et al.

[11] Patent Number: 5,377,332
[45] Date of Patent: Dec. 27, 1994

[54] BUS ARBITRATION ALGORITHM AND APPARATUS

[75] Inventors: Graham Entwistle, Bolton; John Doyle, Franklin; Mark Desmarais, Shrewsbury; Tim Sullivan, Clinton, all of Mass.

[73] Assignee: Data General Corporation, Westboro, Mass.

[21] Appl. No.: 921,456

[22] Filed: Jul. 28, 1992

Related U.S. Application Data

[63] Continuation of Ser. No. 416,254, Oct. 2, 1989, abandoned.

[51] Int. Cl.⁵ .................. G06F 13/14; G06F 13/36
[52] U.S. Cl. .................. 395/325; 364/DIG. 1; 364/229; 364/229.2; 364/230.1; 364/240; 364/242.6; 364/242.7; 364/242.8; 364/242.9
[58] Field of Search .................. 395/725, 325, 425; 370/85, 85.9; 340/825.5

[56] References Cited

U.S. PATENT DOCUMENTS

| | | | |
|---|---|---|---|
| 4,209,841 | 6/1980 | Bambara et al. | 395/325 |
| 4,458,314 | 7/1984 | Grimes . | |
| 4,574,350 | 3/1986 | Starr . | |
| 4,586,175 | 4/1986 | Bedard et al. | 370/85 |
| 4,641,266 | 2/1987 | Walsh . | |
| 4,644,533 | 2/1987 | Braff et al. | 370/94 |
| 4,766,536 | 8/1988 | Wilson et al. | 395/325 |
| 4,831,523 | 5/1989 | Lewis et al. . | |
| 4,896,266 | 1/1990 | Klashka et al. . | |
| 4,932,024 | 6/1990 | Bonicioli et al. | 370/85.9 |
| 4,937,733 | 6/1990 | Gillett, Jr. et al. | 395/325 |
| 4,964,034 | 10/1990 | Jaskowiak | 395/325 |
| 4,969,120 | 11/1990 | Azeveda et al. | 395/325 |
| 4,979,100 | 12/1990 | Makris et al. | 395/325 |
| 5,027,348 | 6/1991 | Curry, Jr. | 370/85.1 |
| 5,047,921 | 9/1991 | Kinter et al. | 395/650 |
| 5,051,962 | 9/1991 | Eaton | 367/33 |
| 5,062,035 | 10/1991 | Tanimoto et al. | 395/550 |
| 5,068,785 | 11/1991 | Sugiyama | 395/325 |

*Primary Examiner*—Allen R. Macdonald
*Assistant Examiner*—Ayaz R. Sheikh
*Attorney, Agent, or Firm*—Robert F. O'Connell

[57] ABSTRACT

A bus arbitration algorithm using round robin and variable packet counts. In addition, each node is assigned a maximum packet size which can be adjusted by the operating system. The round robin determines which node will be granted the bus based on priority on a serial wrap-around list. The packet count is one factor in determining how long the node granted the bus may use it. The maximum packet size is a second factor in determining the permitted duration on the bus.

10 Claims, 4 Drawing Sheets

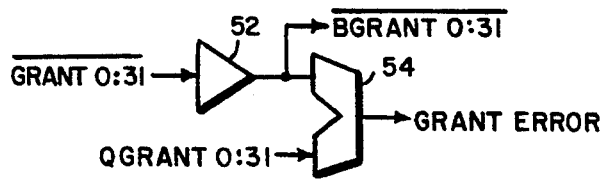
FIG. 5
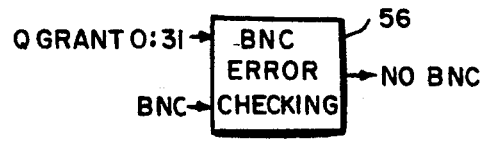
FIG. 6
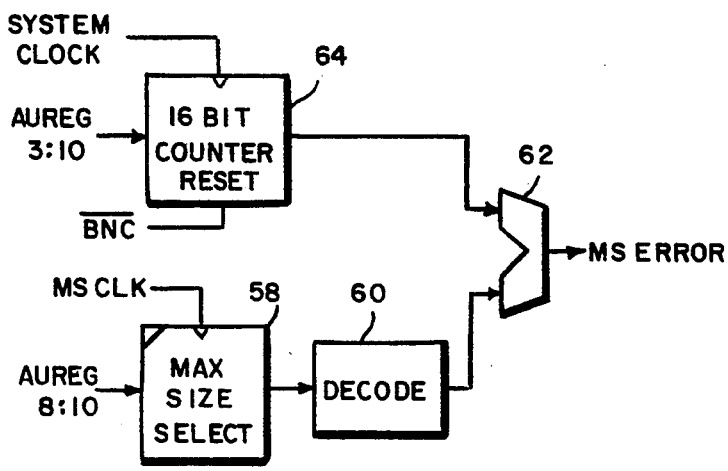
FIG. 7
| AU REGISTER BIT FORMATS | | | | | | | | | | | FUNCTION |
|---|---|---|---|---|---|---|---|---|---|---|---|
| 0 | 1 | 2 | 3 | 4 | 5 | 6 | 7 | 8 | 9 | 10 | |
| 0 | 0 | ← | P COUNT ADDR | | | → | ← | P COUNT DATA | | → | LOAD PACKET COUNT REGISTER FILE |
| 0 | 1 | 0 | ← | | | LOAD 16 BIT CNTR 8–15 | | | | → | LOAD 16-BIT COUNTER |
| 0 | 1 | 1 | ← | | | LOAD 16 BIT CNTR 0–7 | | | | → | |
| 1 | 0 | 0 | | | F0 | F1 | F2 | C0 | C1 | C2 | FORCE / CLEAR ERRORS |
| 1 | 0 | 1 | | | | | | B0 | B1 | B2 | MAXIMUM PACKET SIZE |
| 1 | 1 | | | | | | DDB | USP | KBD | KBA | TEST AND MISCELLANEOUS FUNCTIONS |
FIG. 8

BUS ARBITRATION ALGORITHM AND APPARATUS

This is a continuation of copending application Ser. No. 07/416,254 filed on Oct. 2, 1989 now abandoned.

BACKGROUND OF THE INVENTION

The present invention is directed to a method for arbitrating the use of a system bus and the apparatus for implementing same.

When a system bus is shared by numerous modules, it is necessary to arbitrate the use of the shared resource. The needs of a system must be considered when selecting and implementing an arbitration algorithm. On the one hand, an arbitration algorithm must provide quick access to the bus for the highest priority uses. On the other hand, it is undesirable to have a system in which the lowest priority users are unable to gain access to the bus.

One example of a commonly used arbitration algorithm is the use of a round robin. In using a round robin, the modules on the system bus are sequenced and access to the bus is provided to each module in the predetermined sequence. The round robin system guarantees that the lowest priority users will have an opportunity to access the system bus.

Another arbitration system is disclosed in co-pending patent application Ser. No. 798,595, filed Nov. 15, 1985 and assigned to the same assignee as the present invention. In this system, when a system bus line is freed, any requestor wishing to use the bus asserts a request line. All requestors that have asserted their request line in the clock cycle in which the busy line was free will be provided with access to the bus in order of a predetermined priority ranking the requesting modules. When the last of these requestors has been granted the bus, the busy line is freed for a new set of requestors.

It is an object of the present invention to combine two methods of arbitration in order to provide a desirable balance between granting the bus to high priority requestors and allowing low priority requestors an opportunity to use the bus.

SUMMARY OF THE INVENTION

The present invention is directed to arbitrating the use of a system bus. Each potential requestor on this system bus is assigned a maximum packet count. This sets forth the maximum number of packets which may be transferred over the bus by a requestor when it obtains access to the bus. Packet refers to a bundle of information which is sent over the system bus from one node to another. A requestor wishing to use the bus sends a request signal to the arbitration controller. The arbitration controller awards priority in a round robin method to the highest priority requestor from a serial wrap-around list. The maximum packet count assigned to the requestor which is awarded priority on the bus is decremented and transferred into a storage location. An accumulator decrements the value in the storage location as each packet is sent out over the bus. Access to the bus will be provided to the next highest priority requestor on the wrap-around list after either the requestor on the bus deasserts its request line or when the packet count in the storage location is decremented to 0.

The maximum packet count for each requestor is advantageously stored in a register or memory location so that the maximum packet counts can be easily changed by the computer system. This provides a dynamic system that can change the amount of access time each requestor has available for use on the bus.

Other objects and advantages of the invention will become apparent during the following description of the presently preferred embodiment of the invention taken in conjunction with the drawings.

BRIEF DESCRIPTION OF THE DRAWINGS

FIG. 5 is a schematic block diagram of a grant error detection unit of the error detection block in the arbitration controller of FIG. 2.

FIG. 6 is a schematic block diagram of a BNC error detection unit of the error detection block in the arbitration controller of FIG. 2.

FIG. 7 is a schematic block diagram of a maximum packet size error detection unit of the error detection block in the arbitration controller of FIG. 2.

FIG. 8 is block diagram of the decoding table associated with the arbitration unit register of FIG. 2.

DETAILED DESCRIPTION OF THE PREFERRED EMBODIMENT

Figure 1:
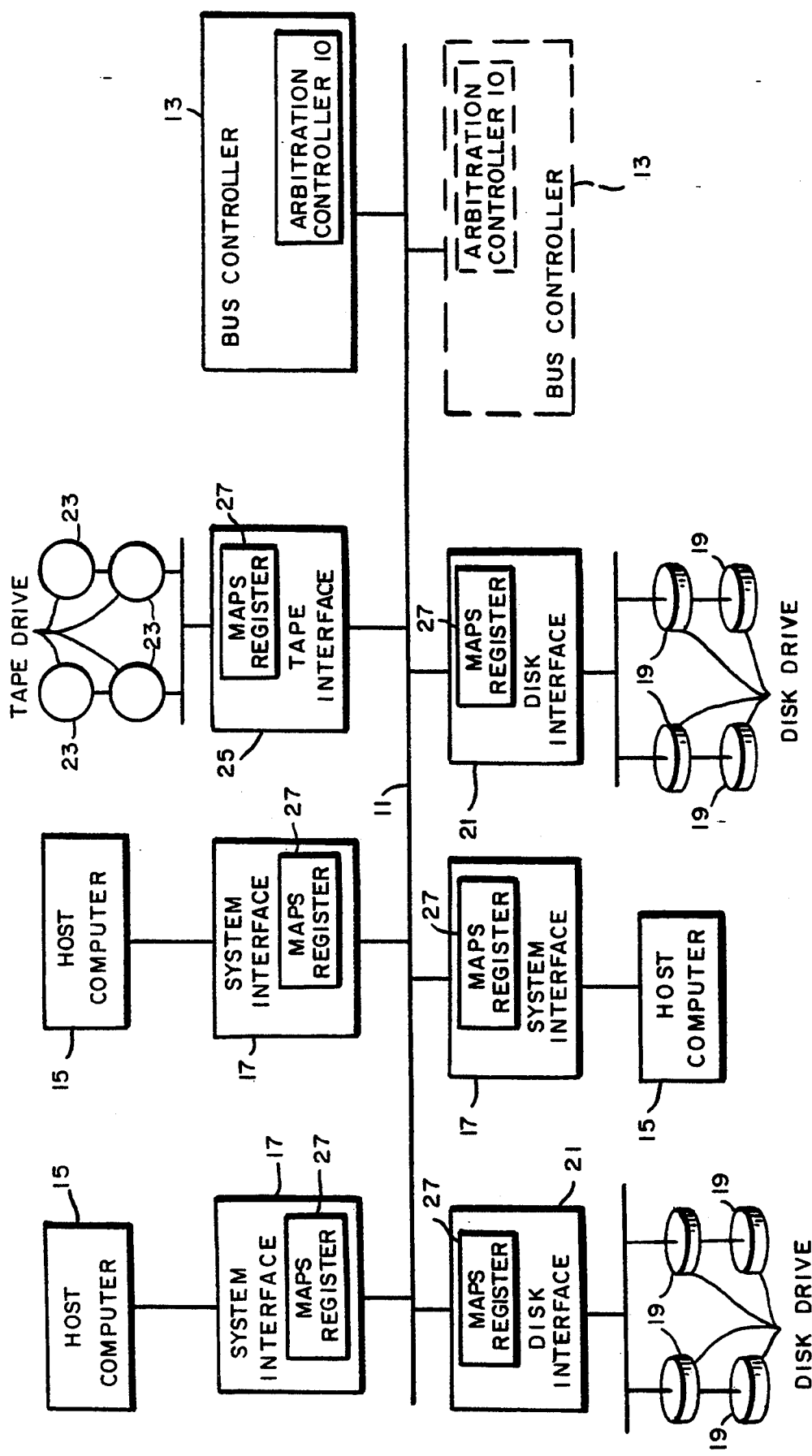
FIG. 1 is a block diagram overview of a bus system using the arbitration algorithm of the present invention.

Referring now to FIG. 1, a bus system for implementing the arbitration algorithm of the present invention is shown. A bus 11 services a number of nodes. In the presently preferred embodiment of the system, a bus for servicing 32 nodes is provided. It is not necessary to have a board inserted into each node of the system bus. FIG. 1 shows 8 nodes each having an inserted board. The system bus 11 may service IO units, hosts or other controllers. The arbitration controller 10 of the present invention is located in a bus controller module 13 on the system bus 11. The present invention may be implemented by including an optional redundant bus controller along with a redundant arbitration controller 10. The redundant controllers are shown in dashed lines. When the redundant controllers are inserted into the system bus 11, the two arbitration controllers operate in a master/slave configuration. Host computers 15 interface through a system interface 17 to the system bus 11. Disk drives 19 interface with the system bus through a disk interface 21. Tape drives 23 interface with the system bus through a tape interface 25.

One feature of the present invention is that at each node, other than the nodes occupied by a bus controller (the bus controller does not send packets on the bus), there is a MAPS register 27. MAPS stands for maximum packet size. In accordance with the presently preferred embodiment, a packet is comprised of three fields, a descriptor field, a signature field and a data field. The descriptor field describes the packet's function and identifies its destination. The signature field identifies the source of a packet. The data field contains any data associated with the packet's function. The MAPS register, which may be a memory location is 16 bits long according to the presently preferred embodiment. This specifies the maximum length of the packets it can transmit. The length of a packet is measured by the number of doublewords. The descriptor field and signature field each constitute a doubleword. Thus, a packet with a length of 4 would contain a descriptor field, a signature field and two double words of data within the data field. Since the MAPS registers are 16 bits, the maximum length of a packet is $2^{16}-1$.

At power up, each of the MAPS registers is automatically filled with a predetermined value. According to the presently preferred embodiment, that value is 16. It is a feature of the present invention that after power up, the MAPS registers will be dynamically adjusted by the operating system through the bus controller. Thus, the MAPS registers can be customized to accommodate different needs of the differing types of interfaces hooked onto the system bus 11. At each node, the MAPS register 27 is used to prevent a packet from containing more than the maximum number of double words. Thus, the MAPS register is used to control the size of the data fields in a node's packets. Since the larger a packet the more time will be needed on the system bus by a node, control of the value in the MAPS registers provides a flexible way of adjusting the amount of time a node is entitled to make use of the system bus 11.

Figure 2:
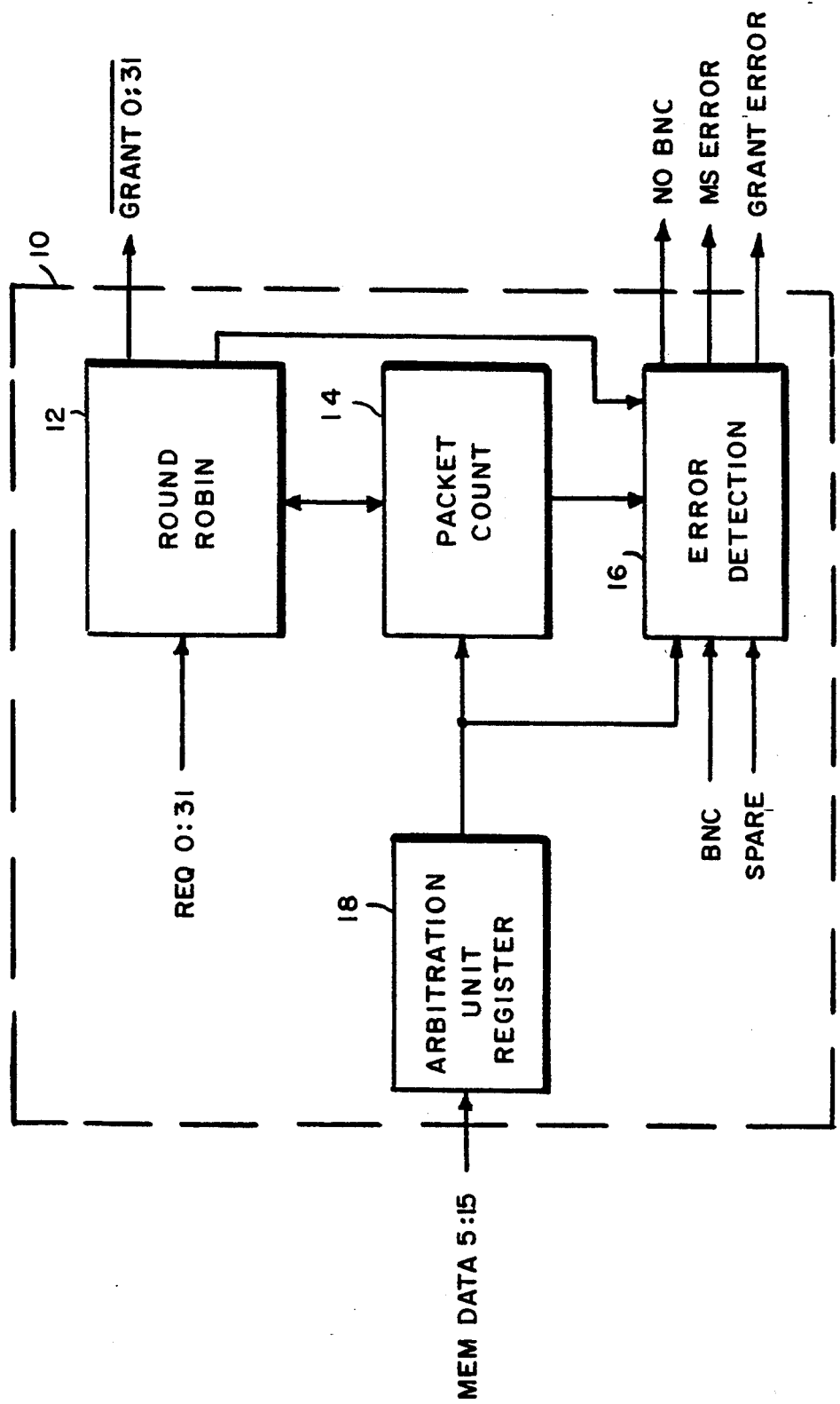
FIG. 2 is a block diagram overview of the arbitration controller of the present invention.

Referring now to the arbitration algorithm for controlling access to the system bus 11. An arbitration controller is shown in schematic form in FIG. 2. The first level of arbitration in the arbitration controller is performed by the round robin unit 12. The round robin unit 12 receives 32 request signal lines, one for each node, and grants the use of the system bus 11 to one of the 32 nodes. A second level of arbitration is performed by the packet count unit 14. Packet count unit 14 determines the maximum number of packets a node may transmit when it is awarded the bus 11 by the round robin unit 12. An error detection unit 16 detects arbitration related error conditions. An arbitration unit register 18 is used to load arbitration registers. For example, the maximum packet counts are loaded through the arbitration unit register into the packet count unit 14 to identify the maximum number of packets count permitted for each of the 32 nodes. According to the presently preferred embodiment, the arbitration unit register is an 11 bit register which is used to load the arbitration registers and also to mask, clear and force errors.

Figure 3:
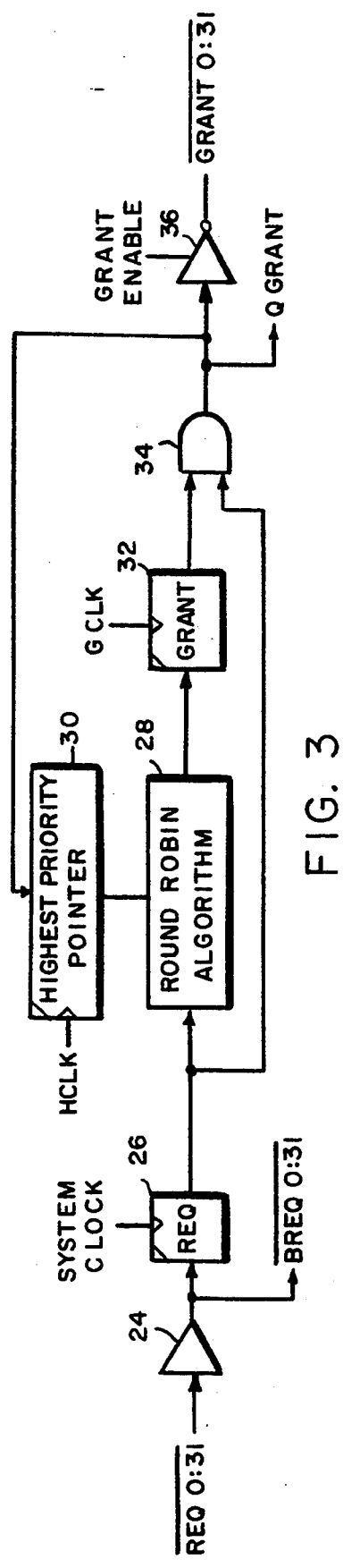
FIG. 3 is a schematic block diagram of the round robin unit of the arbitration controller of FIG. 2.

The round robin unit 12 shall be described in greater detail with reference to FIG. 3. A request line is fed into the round robin unit 12 from each of the nodes on the system bus. The request lines are fed through a request input buffer 24. The request input buffer 24 provides the request lines to a request register 26. The request input buffer 24 also provides buffered request lines for use by other units in the arbitration controller. The request register 26 is a 32 bit register which registers the buffered request lines in each cycle on the rising edge of the system clock.

A round robin unit 28 performs the round robin algorithm for granting the bus to requestors. The round robin unit 28 arbitrates from among the requesting nodes as indicated by the request lines received from the request register 26. There are 32 grant lines which are sourced by the round robin unit. Only one of these grant lines may be asserted at any one time corresponding to the node which is both currently requesting the bus and has the highest round robin priority of all requestors. Priority is determined from a sequenced list of nodes numbered from 0 to 31 which is repeated in serial wrap-around fashion. In other words, node 0 follows node 31 in priority. If no nodes are requesting, then none of the grant lines are asserted.

The round robin unit 28 is informed of the node with the highest round robin priority from a highest priority pointer 30. The highest priority pointer 30 is a 32 bit register used to identify the node with the highest round robin priority. Each time a node is granted access to the bus the highest priority pointer 30 registers the grant lines so as to maintain an indication of which node has been granted the bus. The highest priority pointer has 32 output lines which indicate the node which has the highest priority rather than the node which has already been granted access. Therefore, the grant lines which are input into the highest priority pointer 30 source the next higher pointer lines. Thus, when node 3 is granted the bus, node 4 becomes the node with the highest round robin priority. Since the priority is granted in serial wrap-around fashion, when node 31 is granted the bus, node 0 becomes the node with the highest round robin priority. The highest priority pointer 30 always contains a single asserted bit. The bit which is asserted at any given time identifies the node with the highest round robin priority. On power up, a grant to node 31 is forced thereby initializing the highest priority pointer register to identify node 0 as the node with the highest round robin priority.

An HCLK signal indicates when a bus grant is made and clocks the highest priority pointer. HCLK is asserted when any grant is asserted and when a busy next cycle (BNC) signal is deasserted. The BNC signal is a line on the bus which is driven by the node that has access to the bus. When the node with the bus intends to use the bus in the next cycle, the BNC signal is asserted. The busy next cycle signal is deasserted or freed up on the cycle before completion of the node's use of the bus. Therefore, on the last cycle before a transfer of the bus is made, the BNC signal is deasserted and the HCLK signal is asserted indicating a grant cycle has begun. When HCLK is asserted, the highest priority pointer 30 registers the new node with the highest priority.

The round robin unit 28 combines the highest priority pointer lines with the request lines to determine the highest priority node requesting the bus. This node is provided through a grant line to a grant register 32. The grant register 32 contains at most a single asserted bit. If no bits are asserted, then no nodes are requesting the bus. If a bit is asserted then that bit identifies the highest priority node requesting the bus. The round robin unit 28 may output several different grant signals during the course of waiting for a node to complete its use of the bus. The GCLK signal controls when the grant lines in the grant register 32 will be updated with the signal from the round robin unit 28. Grant register 32 is normally clocked once a cycle. However, the GCLK clock signal which clocks the grant register 32 is held while the packet count unit 14 determines if the node which has been granted the bus is still requesting the bus and is entitled to send more packets. If both these conditions are true, the node controlling the bus is entitled to send more packets and is still requesting the bus then the GCLK signal is held so as to preserve the current state of the grant lines. If the node controlling the bus is not entitled to send more packets or is no longer requesting the bus, the GCLK signal is enabled and the next highest priority node is registered from the round robin unit.

An AND unit 34 receives the output of the grant register 32 and the request lines from the request register 26. The AND unit 34 prevents the assertion of the appropriate grant line for a node which has withdrawn its request for the bus. The output of the AND unit 34 is provided to the highest priority pointer 30 so that it may indicate the next highest priority node. The results of the AND unit 34 are also provided to grant line drivers 36 which drive the results onto the system bus. The grant lines provided over the system bus indicate to the nodes which node may next use the system bus.

Figure 4:
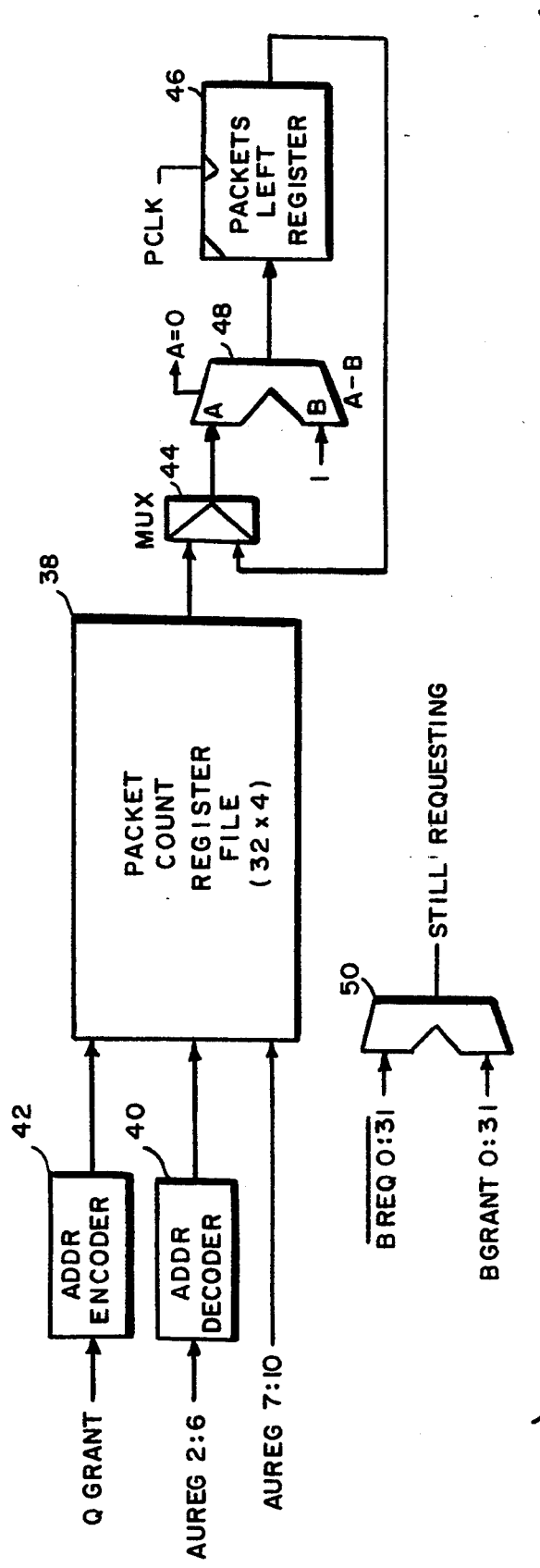
FIG. 4 is a schematic block diagram of the packet count unit of the arbitration controller of FIG. 2.

Referring now to FIG. 4, the packet count unit will be described in more detail. The packet count unit 14 contains a packet count register file 38 which stores the maximum number of packets each node may transmit after obtaining use of the bus from the round robin unit. In the preferred embodiment, the size of the register file is 32×4. The packet count register file 38 is loaded by means of an address decoder 40. The address decoder 40 receives bits 2-6 from the arbitration register unit and uses those bits as the write address. Bits 7-10 from the arbitration unit register are written into the write address. Thus, the arbitration unit register controls the loading of the packet count register file.

An address encoder 42 encodes the 32 bit output of the AND gate 34 from the round robin unit. The result achieved in the address encoder 42 is used as a read address for the packet count register file 38. The maximum packet count stored at the read address will be output from the register file and into an arithmetic logic unit multiplexor 44. A packets left register 46 also sources the multiplexor 44. The packets left register stores the output of an arithmetic logic unit or accumulator 48 to indicate the number of packets which a node having control of the bus may transmit if it continues to request the bus. The packets left register is clocked each time a node which is using the bus begins transmitting a packet until the node is no longer requesting the bus or the packets left register 46 is decremented to 0.

The arithmetic logic unit multiplexor 44 normally selects the packet count register file output for sending to the arithmetic logic unit 48. When a node granted the bus continues to request the bus and has a maximum packet count greater than 0, then the multiplexor 44 selects the output of the packets left register 46. The packets left register output will continue to be selected by the multiplexor 44 until the node discontinues requesting the bus or transmits a number of packets equal to its maximum packet count.

The arithmetic logic unit 48 provides two functions. It compares to 0 and it decrements by 1. These functions are performed simultaneously on the output of the multiplexor 44. The packets left register 46 is sourced with the decremented value. The results of the compare to 0 are a source for the grant clock circuitry GCLK servicing grant register 32. If the grant register clock GCLK is disabled, it is reenabled when the output of the multiplexor is equal to 0.

Another component of the packet count unit 14 is the request compare unit 50. The request compare unit 50 compares the state of the buffered request lines with the state of the buffered grant lines to check if a node which has been granted the bus is still requesting the bus. This allows a node to be continuously granted use of the bus if it keeps its request line asserted and is allowed to send multiple packets per round robin grant as determined by its packets left value. The request compare 50 is also used as a source for the GCLK clock to the grant register 32. If the grant register clock GCLK is disabled, it is reenabled when the output of the request compare 50 indicates that a node which has been granted the bus is no longer requesting it.

Turning now to the error detection unit 16, three error detection schemes are illustrated herein. FIG. 5 illustrates components useful when a bus controller is used in conjunction with an identical second bus controller. If two redundant bus controllers are identically initialized, they run in tandem simultaneously registering the request lines, processing them and determining the correct state of the grant lines. The two bus controllers operate in a master/slave relationship. By running the two redundantly, the slave bus controller which doesn't actually drive the grant lines, is allowed to compare the output of its AND unit 34 with the buffered grant lines driven by the master bus controller. If the buffered grant lines differ from the master bus controller's grant lines and if arbitration has not been halted or disabled, an error condition exists and the slave bus controller asserts its grant error signal.

In the master bus controller, the grant error signal can be used to check if the grant line drivers 36 are operating properly. Thus, in the master bus controller the output of AND unit 34 is compared with the buffered grant lines. If these do not match, there is an error signal indicating a problem with the grant line drivers.

The error detection component of FIG. 6 monitors the BNC line. The BNC line is monitored by the BNC error checker 56 when the output of the AND unit 34 contains an asserted bit and the grant line drivers are enabled. First, the BNC line is unasserted when the bus has been granted. During the next cycle, the BNC error checker 56 continues to monitor the BNC line to check that it is asserted after the bus has been granted. If the BNC line is not asserted, the BNC error checker 56 asserts its no BNC signal.

FIG. 7 illustrates an error detection component which determines whether there has been an error in the size of a packet. This is merely a gross error check since packet size is only compared with a maximum size for the system. This particular error check does not use the MAPS value for the node controlling the bus and thus, won't signal an error whenever the appropriate MAPS value is exceeded. A max size select register 58 stores the encoded maximum system packet size as provided by the arbitration unit register. The three bits in register 58 are used to identify any of sixteen different maximum sizes that can have a value as high as 2 to the 16th power minus one. A decoder 60 is provided for decoding the encoded maximum system packet size stored in the maximum size select register 58. A comparator 62 compares the decoded maximum system packet size with the output from a counter 64. The preferred embodiment employs a 16 bit counter 64. The counter 64 counts each double word in a packet as it is transmitted over the bus 11. While the BNC signal is unasserted, the 16 bit counter is reset to zero and inhibited from counting. Once BNC is asserted, signalling use of the bus by a node, the counter 64 is enabled and begins counting up, increasing its value by 1 at each rising edge of the system clock. Should the counter output equal the maximum system packet size, the comparator 62 asserts the MS error signal. This error signal may be disabled, cleared or forced via the arbitration unit register.

The maximum system packet size is loaded into the maximum size select register 58 through the arbitration unit register. When the maximum size select register is to be loaded the arbitration unit register enables the MSCLK signal. In the preferred embodiment, one of 8 values may be chosen for the maximum size. The value closest to, but greater than the largest MAPS value in the system is the choice which normally should be made. Tests can be conducted on the error checker by loading the 16 bit counter 64 from the arbitration unit register.

The arbitration unit register provides the interface between the bus controller's processing unit and the bus controller units including the packet count and error detection. The arbitration unit register is used to load the maximum packet count values into the packet count register file; to mask, clear and force bus controller errors; to load the maximum system packet count into the MS error units maximum select register; and to load the MS error unit 16 bit counter for testing.

Values received by the arbitration unit register are interpreted by the arbitration unit in accordance with the various formats illustrated in FIG. 8. When bits 0 and 1 are both zero, the arbitration unit register loads the packet count register file with a packet count maximum for one of the nodes. The next two values are used for loading a test value into the 16 bit counter 64. The value beginning with 100 is used in error detection for forcing and clearing errors. The value beginning 101 is used for writing the maximum system packet size into the maximum size select register 58. The final value provides for miscellaneous functions. For example, in the preferred embodiment, if bit 7 is asserted that means to disable the grant output buffers. Assertion of bit 8 in the final test and miscellaneous instruction means to use a spare bit in place of the BNC signal. If the system operating on a system bus has been alerted to a malfunction in the BNC line, it may switch over to a spare line when that is available as part of the system. Assertion of the bit 9 in the miscellaneous instruction forces the BNC line to be deasserted. Assertion of the bit 10 forces the BNC line to be asserted by the bus controller.

Of course, it should be understood that various changes and modifications to the preferred embodiment described above will be apparent to those skilled in the art. For example, instead of decrementing a maximum packet count and comparing to zero, an equivalent system could increment a count value from zero and compare the value with a maximum packet count. These and other changes can be made without departing from the spirit and the scope of the invention and without diminishing its attendant advantages. It is therefore intended that such changes and modifications be covered by the following claims.

WE claim:

1. A method for arbitrating use of a bus comprising the steps of:
    (a) individually assigning a separate maximum packet count to each of a plurality of nodes on said bus;
    (b) one or more of said plurality of nodes asserting requests to use said bus;
    (c) identifying a highest priority node of the requesting nodes from a serial wrap-around list of said plurality of nodes;
    (d) granting the bus to the highest priority node of the requesting nodes on said serial wrap-around list;
    (e) repeatedly decrementing a counting value, initially set at the maximum packet count assigned to the node which was granted the bus, at intervals corresponding to a packet being transmitted on said bus from said node;
    (f) changing the highest priority node to the next highest priority node on said serial wrap-around list which follows the node which was granted the bus;
    (g) repeating steps d, e and f when the counting value equals zero or when the request from the node granted the bus is deasserted, whichever comes first.

2. The method of claim 1 further comprising the step of individually inputting a maximum packet size to a register at each of said plurality of nodes on said bus so that a packet sent by a node is prevented from exceeding its respective maximum packet size.

3. The method of claim 1 further comprising redundantly performing steps a–g except rather than actually granting the bus, identifying the node which is to be granted the bus and indicating an error if said identified node differs from the node which was granted the bus.

4. The method of claim 1 further comprising the step of counting packet size on said bus and indicating an error if said size exceeds a miximum size.

5. The method of claim 1 wherein the step of individually assigning comprises loading a number for each node into a packet count register file.

6. A method of arbitrating use of a bus comprising the steps of:
    (a) individually assigning a separate maximum packet count to each of three or more nodes on said bus;
    (b) one or more of said three or more nodes asserting requests to use said bus;
    (c) identifying a highest priority node of the requesting nodes from a serial wrap-around list of said three or more nodes;
    (d) granting the bus to the highest priority node of the requested nodes on said serial wrap-around list;
    (e) repeatedly decrementing a counting value, initially set at the maximum packet count assigned to the node which was granted the bus, at intervals corresponding to a packet being transmitted on said bus from said node;
    (f) changing the highest priority node to the next highest priority node on said serial wrap-around list which follows the node which was granted the bus;
    (g) repeating steps d, e and f when the counting value equals zero of when the request from the node granted the bus is deasserted, whichever comes first.

7. The method of claim 6 further comprising the step of individually inputting a maximum packet size to a register at each of said three or more nodes on said bus so that a packet sent by a node is prevented from exceeding its respective maximum packet size.

8. The method of claim 6 further comprising redundantly performing steps a–g except rather than actually granting the bus, identifying the node which is to be granted the bus and indicating an error if said identified node differs from the node which was granted the bus.

9. The method of claim 6 further comprising the step of counting packet size on said bus and indicating an error if said size exceeds a maximum size.

10. The method of claim 6 wherein the step of individually assigning comprises loading a number for each node into a packet count register file.

* * * * *